US007640460B2

(12) United States Patent
Bahl et al.

(10) Patent No.: US 7,640,460 B2
(45) Date of Patent: Dec. 29, 2009

(54) DETECT USER-PERCEIVED FAULTS USING PACKET TRACES IN ENTERPRISE NETWORKS

(75) Inventors: Paramvir Bahl, Issaquah, WA (US); Ranveer Chandra, Kirkland, WA (US); Lun Li, Pasadena, CA (US); David A. Maltz, Bellevue, WA (US); Ming Zhang, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 422 days.

(21) Appl. No.: 11/680,477

(22) Filed: Feb. 28, 2007

(65) Prior Publication Data

US 2008/0209273 A1 Aug. 28, 2008

(51) Int. Cl.
*G06F 11/00* (2006.01)

(52) U.S. Cl. ........................................................ 714/47

(58) Field of Classification Search ....................... None
See application file for complete search history.

(56) References Cited

U.S. PATENT DOCUMENTS

| | | | |
|---|---|---|---|
| 4,933,933 | A | 6/1990 | Dally et al. |
| 5,309,448 | A | 5/1994 | Bouloutas et al. |
| 5,850,388 | A | 12/1998 | Anderson et al. |
| 6,115,393 | A | 9/2000 | Engel et al. |
| 6,336,138 | B1 | 1/2002 | Caswell et al. |
| 6,373,825 | B1 | 4/2002 | Fuchs et al. |
| 6,442,694 | B1 | 8/2002 | Bergman et al. |
| 6,456,306 | B1 | 9/2002 | Chin et al. |
| 6,574,788 | B1 | 6/2003 | Levine et al. |
| 6,628,304 | B2 | 9/2003 | Mitchell et al. |
| 6,704,812 | B2 | 3/2004 | Bakke et al. |
| 6,751,661 | B1 | 6/2004 | Geddes |
| 6,826,590 | B1 | 11/2004 | Glanzer et al. |
| 6,873,619 | B1 | 3/2005 | Edwards |
| 6,959,403 | B2 | 10/2005 | Dierauer et al. |
| 6,993,686 | B1 | 1/2006 | Groenendaal et al. |
| 7,131,037 | B1 | 10/2006 | LeFaive et al. |
| 7,142,820 | B1 | 11/2006 | Rajala |
| 7,151,744 | B2 | 12/2006 | Sarkinen et al. |

(Continued)

FOREIGN PATENT DOCUMENTS

EP 1191803 A1 3/2002

(Continued)

OTHER PUBLICATIONS

Bahl, et al., "Towards Highly Reliable Enterprise Network Services Via Inference of Multi-level Dependencies" SIGCOMM'07, Aug. 27-31, 2007, pp. 1-12.

(Continued)

*Primary Examiner*—Michael C Maskulinski
(74) *Attorney, Agent, or Firm*—Lee & Hayes, PLLC

(57) ABSTRACT

Exemplary methods, computer-readable media, and systems for detecting a fault by a packet trace, includes monitoring at least one packet transmitted to or received from, an computing device of an end user, between one or more computing devices implementing at least one of a service or an application on an enterprise network. The process also includes identifying whether an abnormal condition occurred on the computing device of the end user based on monitoring at least one packet transmitted to or received from, the computing device of the end user; and detecting a fault by using an algorithm based on monitoring at least one packet transmitted or received from, the computing device of the end user; wherein the fault indicates a desired course of action did not occur while the computing device of the end user uses at least one of the service or the application in the enterprise network.

18 Claims, 8 Drawing Sheets

EXEMPLARY METHODS FOR DETECTING FAULT

200

MONITORING PACKETS 202

TRACKING RESPONSE TIME 204

TRACKING INTERACTION WITH STATE TRANSITION DIAGRAM 212

COMPARING TO HISTORICAL TREND 206

IDENTIFYING FAULT OCCURRENCE 214

DETECTING FAULT 220

USING ALGORITHM 230

U.S. PATENT DOCUMENTS

| | | | | |
|---|---|---|---|---|
| 7,269,625 | B1 | 9/2007 | Willhide et al. | |
| 7,328,127 | B2 * | 2/2008 | Otsuka et al. | 702/182 |
| 7,483,379 | B2 * | 1/2009 | Kan et al. | 370/237 |
| 2002/0032769 | A1 | 3/2002 | Barkai et al. | |
| 2002/0165957 | A1 | 11/2002 | Devoe et al. | |
| 2003/0084146 | A1 | 5/2003 | Schilling et al. | |
| 2004/0172467 | A1 | 9/2004 | Wechter et al. | |
| 2005/0071445 | A1 | 3/2005 | Siorek et al. | |
| 2005/0071457 | A1 | 3/2005 | Yang-Huffman et al. | |
| 2005/0226195 | A1 | 10/2005 | Paris et al. | |
| 2005/0243729 | A1 | 11/2005 | Jorgenson et al. | |
| 2006/0085858 | A1 | 4/2006 | Noel et al. | |
| 2006/0153068 | A1 | 7/2006 | Dally et al. | |
| 2007/0043861 | A1 * | 2/2007 | Baron et al. | 709/224 |
| 2007/0162595 | A1 | 7/2007 | Samprathi | |
| 2008/0016206 | A1 | 1/2008 | Ma et al. | |

FOREIGN PATENT DOCUMENTS

| | | | |
|---|---|---|---|
| WO | WO03067431 | A1 | 8/2003 |
| WO | WO2005060162 | A2 | 6/2005 |

OTHER PUBLICATIONS

Kandula, et al., "Shrink: A Tool for Failure Diagnosis in IP Networks", SIGCOMM'05 Workshops, Aug. 2005, pp. 1-6.

Kompella, et al., "IP Fault Localization Via Risk Modeling", University of California and AT&T Labs-Research, pp. 1-15.

Lau, et al., "Service Model and Its Application to Impact Analysis", Telcordia Transactions, 2004, pp. 1-12.

Reynolds, et al., "WAP5: Black-box Performance Debugging for Wide-Area Systems", International World Wide Web, May 23-26, 2006, pp. 1-10.

Rish, et al., "Efficient fault diagnosis using probing", AAAI, 2005, pp. 1-8.

SMARTS, "InCharge Application Services Manager User's Guide", System Management ARTS Incorportated, Version 5.0.1, Dec. 2002, pp. 1-76.

Yemini, et at., "High Speed and Robust Event Correlation", IEEE, May 1996, pp. 82-90.

Bahl, et al., "Discovering Dependencies for Network Management", available as early as Dec. 26, 2006, at <<http://research.microsoft.com/projects/constellation/papers/hotnets06.pdf>>, pp. 1-6.

Friedman, et al., "Load Balancing Schemes for High Throughput Distributed Fault-Tolerant Servers", available as early as Dec. 26, 2006, at <<http://historical.ncstrl.org/tr/ps/cornellcs/TR96-1616.ps>>, Dec. 8, 1996, pp. 1-20.

Natu, et al., "Active Probing Approach for Fault Localization in Computer Networks" available as early as Dec. 26, 2006, at <<http://www.cis.udel.edu/~sethi/papers/06/e2emon06.pdf>>, pp. 9.

Steinder, et al., "A survey of fault localization techniques in computer networks", avaliable as early as Dec. 26, 2006, at <<http://www.cis.udel.edu/~sethi/papers/04/socp04.pdf>>, 2004, pp. 165-194.

Steinder, et al., "End-to-end Service Failure Diagnosis Using Belief Networks", available as early as Dec. 26, 2006, at <<http://www.cis.udel.edu/~sethi/papers/02/noms02.pdf>>, University of Delaware, pp. 1-16.

Steinder, et al., "The present and future of event correlation:A need for end-to-end service fault localization", available as early as Dec. 26, 2006, at <<http://www.cis.udel.edu/~steinder/PAPERS/sci2001.pdf>>, pp. 6.

* cited by examiner

EXAMPLARY CUMULATIVE DISTRIBUTION OF TOTAL BYTES OF A URL

600

NUMBER OF SUCCESSFUL URL BYTES

BOTTOM CHART – NUMBER OF FAILURE URL BYTES

700

NUMBER OF PACKETS VERSUS TIME 702

NUMBER OF BYTES PER PACKET VERSUS TIME 704

CUMULATIVE DISTRIBUTION OF NUMBER OF PACKETS AND BYTES PER PACKET 706

800

EXAMPLARY SYSTEM FOR IMPLEMENTING FAULT DETECTION

DETECT USER-PERCEIVED FAULTS USING PACKET TRACES IN ENTERPRISE NETWORKS

RELATED APPLICATIONS

The present application is related to (a.) commonly assigned co-pending U.S. patent application Ser. No. 11/555,571, entitled, "Managing Networks Using Dependency Analysis", to Bahl et al., filed on Nov. 1, 2006; (b.) to commonly assigned U.S. Patent Provisional Application Ser. No. 60/893,348, entitled, "Constructing an Inference Graph" to Bahl et at., filed on Mar. 6, 2007, and (c.) commonly assigned U.S. Patent Provisional Application Ser. No. 60/893,350, "Inferring Potentially-Responsible Candidates" to Bahl et al., filed on Mar. 6, 2007, which are incorporated by reference herein for all that they teach and disclose.

TECHNICAL FIELD

The subject matter relates generally to network management, and more specifically, to systems, methods, and computer-readable media for detecting network faults perceived by end users in a network enterprise.

BACKGROUND

An enterprise network may be a complex infrastructure, such as a large-scale heterogeneous network. This huge and complex enterprise network presents many challenges for engineers in managing and maintaining the performance of the network. For example, large enterprise networks may contain more than 100,000 clients and servers and more than 5,000 routers and switches. In addition, the services that operate on these networks are very complicated. Existing enterprise networks and service monitoring tools are not up to the task of discovering why requests to download a service or an application are being delayed.

The network enterprise includes connecting information technology resources of an organization, which includes users, servers, and the like. In particular, users in the enterprise network may often encounter problems, such as performance problems, service disruptions, and the like. User-perceptible and annoying hangs are rampant, which cause frustrations for the users. Even within an enterprise network, there is little indication of where the problem lies, and how to mitigate the problem. As a result, users in the enterprise network are often inconvenienced due to the performance problems, service disruptions, which can be very time consuming and unproductive.

Accurate and fast fault detection is critical for network management. Existing management systems have tried to detect failures with packet traces, but the traces did not detect failures that affected the end user. Also, it is difficult to identify when problems occur. Thus, packet traces have not been widely utilized for detecting faults perceived by users in an enterprise network.

SUMMARY

This summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In view of the above, this disclosure describes various exemplary systems, methods, and computer program products for detecting user perceived faults using packet traces. This process detects a fault by monitoring packets from a computing device of the end user. This disclosure includes detecting a fault by an algorithm based on monitoring the packets that are transmitted to or received from, a computing device of the end user. Fault may be defined as a desired course of action that did not occur, while accessing a service or an application in an enterprise network. Then, an alert of the fault occurrence may be provided to the appropriate entities.

A system according to the principles of the claimed subject matter for detecting a fault includes a processor, a memory, and an output. The memory stores processing instructions, the processor examines the packets and determines if a fault occurred; and the output displays the fault to the appropriate entities, such as IT administrators, an alert reporting system, a fault diagnosis, or a fault localization system.

BRIEF DESCRIPTION OF THE DRAWINGS

The Detailed Description is set forth with reference to the accompanying figures. The teachings are described with reference to the accompanying figures. In the figures, the leftmost digit(s) of a reference number identifies the figure in which the reference number first appears. The use of the same reference numbers in different figures indicates similar or identical items.

DETAILED DESCRIPTION

Overview

This disclosure is directed to fault detection, and is shown and described in the context of detecting user perceived faults in an enterprise network in a reliable and accurate manner. Traditional fault detections are inadequate for localizing performance faults, such as identifying which users are dissatisfied with the end-to-end response time.

This disclosure describes detecting faults by passively monitoring packets transmitted to or received from, a computing device of the end user, to computing device(s) implementing a service or an application on an enterprise network. This passively monitoring of packet traces does not add any additional packets to the network and may even help reduce the network overload. The techniques described herein address detecting the fault, according to an aggregation of packet traces. By aggregating packet traces, the information becomes useful in detecting faults, rather than having a large collection of packet traces. Thus, the faults are detected and can be used to ensure that the applications and the services used in the enterprise network are working properly and with good performance, for example, by displaying detected faults on an output device for the appropriate entities such as network administrators, or to send alerts of the faults to appropriate entities such as a management system.

In one aspect, an algorithm, known as a white box approach, is used for detecting faults. The white box algorithm constructs a state diagram for monitoring the progress of transactions, for the service or the application that is accessed on the enterprise network. The algorithm transitions between states in the diagram when indicated by the monitored packets. If the normal transitions between states in the diagram are not followed, this indicates a fault occurred during usage of the service or the application on the enterprise network. Furthermore, the white box algorithm may be used to detect faults in HTTP traffic using HTTP headers.

In another aspect, a black box algorithm, is used in detecting faults. The black box algorithm aggregates packets into transactions and extracts relevant information from each transaction. A significant deviation of the relevant information from an expected distribution of the relevant information, indicates a fault occurred on the computing device of the end user. The black box algorithm may be used to detect faults in HTTP traffic and in Exchange traffic.

The fault detections described herein are not limited to any particular application layer or transport layer, but may be applied to many contexts and environments. By way of example and not limitation, the fault detections may be employed in Hypertext Transfer Protocol (HTTP) using Transmission Control Protocol (TCP), Internet Protocol (IP), or User Datagram Protocol (UDP) headers, and the like.

Fault Detection Process

Figure 1:
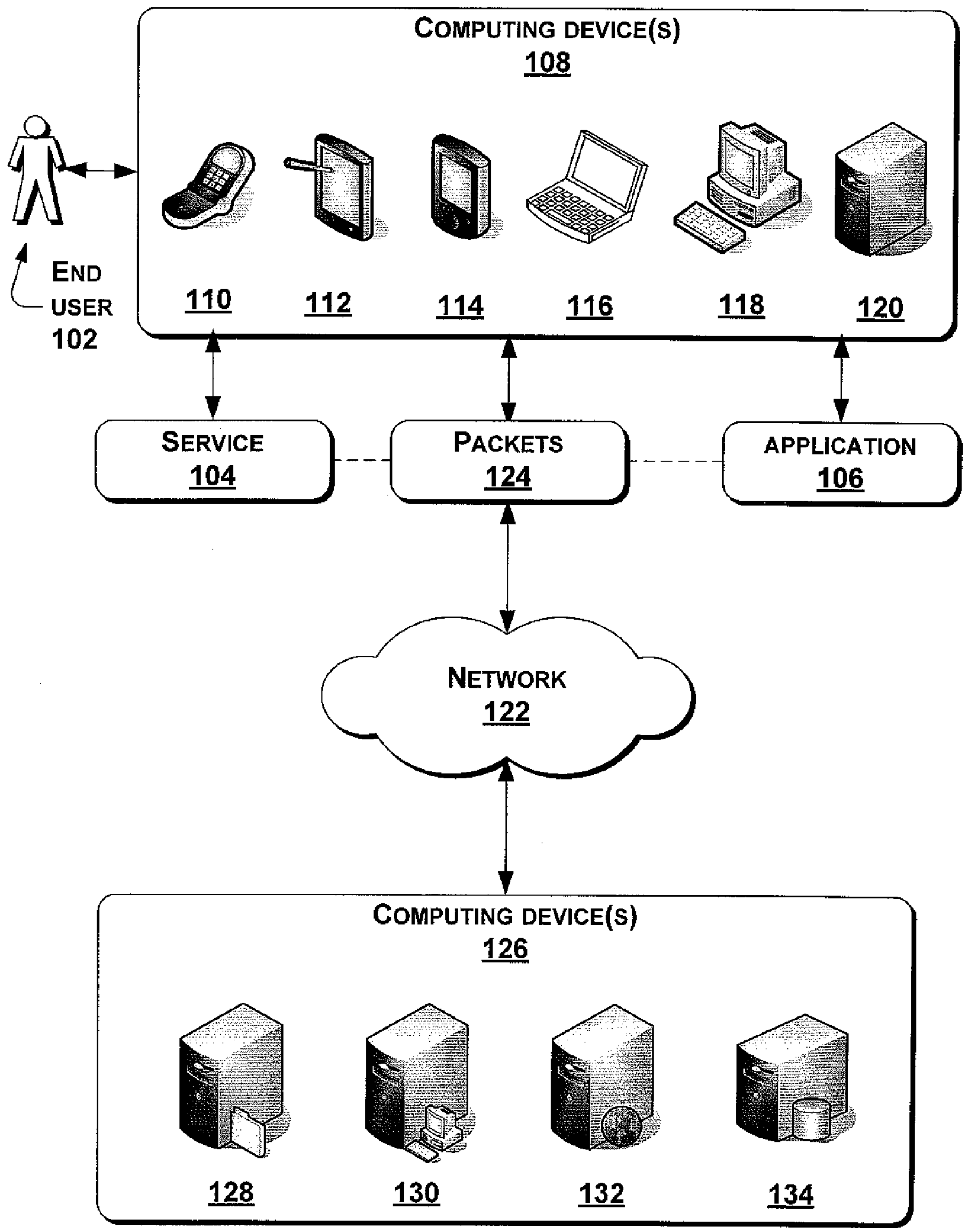
FIG. 1 is a block diagram of an exemplary fault detection process monitoring the packets transmitted to and sent from computing devices.

FIG. 1 illustrates a block diagram of an exemplary fault detection process 100. An end user 102 may access a service 104 (e.g., Domain Name Service (DNS), Authentication Service (Active Directory, Kerberos)) or an application 106 with a computing device(s) 108. The services 104, and the applications 106 include technology resources, which may include access to the web, databases, email, file sharing, software programs, and the like. Computing device(s) 108 that are suitable for use, include but are not limited to, a cellular phone 110, a stylus with a PC tablet 112, a personal digital assistant 114, a laptop 116, a desktop computer 118, a server 120, and the like. These various types of computing devices 108 enable the end user 102 to conduct an activity, such as communicating with others, accessing web pages for information, accessing shared folders or files, sharing information with others, and the like.

Shown in FIG. 1, is an exemplary implementation where the computing device 108 of the end user 102 accesses the service 104 or the application 106 in an enterprise network 122. An enterprise network may be defined as hardware, software, and media connecting information technology resources of an organization. Typically, enterprise networks are formed by connecting network clients, servers, a number of other components like routers, switches, and the like through a communication media.

To determine whether the computing device 108 of the end user 102 has experienced a fault in accessing the service 104 or the application 106, a mechanism to detect a failure perceived by the end user 102 includes monitoring packet 124 traces at the user 102 side. The packets 124 are formatted blocks of information carried by a computer network. The packets 124 may contain detailed information relating to the various services 104, different applications 106, email, and the like. The packets 124 allow detailed or longer information to be transmitted more efficiently and reliably across the network 122.

These packets 124 are transmitted to or received from, a computing device of the end user 108, between one or more computing device(s) 126 implementing at least one of the service 104 or the application 106 in the enterprise network 122. For example, passive monitoring of the packets 124 can reduce network overload and is easy to implement in a server side, an user 102 side, or in the enterprise network 122.

Traditionally, detecting failure from packet traces has been challenging. The packet trace tends to be a collection of information, which contains too much information, and is not very practical or useful to detect any performance problems occurring at the end user. For instance, a simple click of a website may contain hundreds of packets which involve several different application protocols such as DNS, WINS, IPSEC, Kerberos, HTTP as well as several different servers (DNS server, WINS server, authentication server, Web server). There is a need for development of abstract, yet informed models, from packet traces to leverage failure information from standard protocol information.

The abstraction of a standard application protocol is not obvious since there are numerous different application protocols (such as HTTP, SMTP, SMB, DNS), which may behave quite differently. In addition, there are many application programs using the same application protocol (for example: internet explorer, Firefox, Mozilla are all based on HTTP protocols), even for the same application programs, different configuration parameters may result in quite different pattern of packets. However, the fault detection process disclosed removes some of these issues by using algorithms to aggregate the packets according to a user task, in conjunction with the number of packets, bytes, and transaction time to identify a fault or a failure. Failure may be defined as a condition that the delivered service deviates from the specified service.

Existing fault detection methods have included when automated parsing discovers too many "invalid page" HTP return codes, or when the user responds to an error message by hitting the send button to relay the error report. This method is highly intrusive on the user without providing an immediate solution.

Illustrated in FIG. 1 are the one or more computing device(s) 126 implementing the service 104 or the application 106 on the enterprise network 122. The computing devices 126, may include, but are not limited to a file server 128, a management server 130, a web server 132, a database server 134, and the like.

In an implementation, the computing device(s) 126 is a remote computing device, in a distributed computing environment. For example, in the distributed environment, the remote computing devices are linked through a communications network to perform functions. The computing device(s) 126 may have an output device (not shown), to display the fault detection to notify appropriate entities of the fault.

Methods for Detecting a Fault

Figure 2:
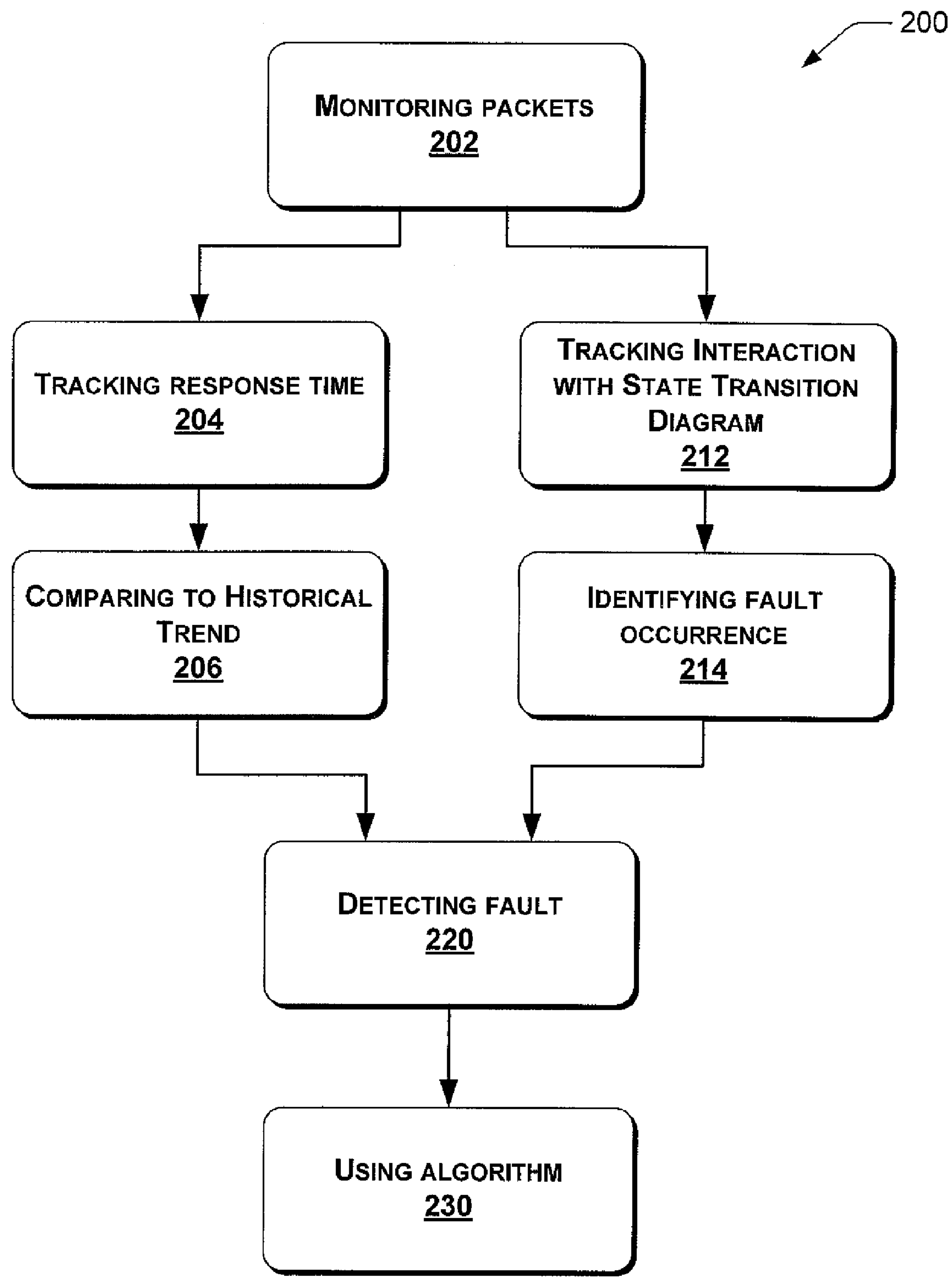
FIG. 2 is a flowchart of an exemplary process for detecting a fault of FIG. 1.

FIG. 2 is an overview flowchart of exemplary processes for detecting the fault 200, shown in FIG. 1. For ease of understanding, the method 200 is delineated as separate steps represented as independent blocks in FIG. 2. However, these separately delineated steps should not be construed as necessarily order dependent in their performance. The order in which the process is described is not intended to be construed as a limitation, and any number of the described process blocks maybe be combined in any order to implement the method, or an alternate method. Moreover, it is also possible that one or more of the provided steps may be omitted.

In one embodiment, starting with block 202, monitoring the packets 124 that are transmitted to or received from, the computing device 108 of the end user 102, to one or more computing device(s) 126 implementing at least one of the service 104 or the application 106 on the enterprise network 122.

Tracing packets outside the enterprise network presents challenges. In particular, the packet traces may be a rather large collection and contain more information then desired. Having a large collection based on the packet traces would increase the complexity and the memory requirements for the memory capacity. This would be a very time consuming and a slow process to evaluate the information. Also, the collection may not provide information relating to the end user. However, this claimed subject matter, fault detection process, removes some of the issues by using algorithms which aggregate the packets according to a user task, use the number of packets, bytes, and transaction time to detect a failure.

The activities that are captured are ones that occur frequently as a means to learn about the health of components in the network 122 and to diagnose user 102 problems. The types of information that may also be collected include user-server interaction, trouble tickets, response times, and the like.

In block 204, tracking the response times between requests, replies, stops, starts, and like activities of the end user 102 is shown. The response times between requests, replies, stops, starts, and the like are tracked for each service 104 or application 106 that the end user 102 contacts.

For example, the response times may include when the user 102 has to restart a web browser, time it takes to download a web page, time it takes to download a program, and the like.

The probabilities for a web server are computed for the computing device 108 of the end user 102, that if the client receives no response, or a response with an HTTP error code indicating failure, the probability is translated into an observation that P(down) =1. These probabilities are used by a related co-pending provisional application No. 60/893,350, as the state of observation node representing the observations of the clients of that service. In addition, the subject matter may use robot clients to detect faults.

Block 206 illustrates comparing the response times against historical averages. For successful responses, the history of response times is tracked and the claimed subject matter fits two Gaussian distributions to the empirical data with the requirement that the mean and standard deviation of the first Gaussian be less than that of a second. For example, the distribution could be modeled by a first Gaussian with mean 200 ms and a second with mean 2 s. Then the P(up) and P(troubled) are computed for a measured response time by determining the probability the response time comes from the respective distribution.

Next the process continues to block 220 for detecting the fault based on the monitoring the packets 124. In block 220, detecting the fault indicates a desired course of action did not occur, while accessing at least one of the service 104 or the application 106 in the enterprise network 122. Block 230 illustrates using the algorithm to detect the fault.

In an exemplary embodiment, the types of faults identified may include: wrong content, correct content, or receive content. Wrong content may mean the wrong web page was downloaded during the process, correct content means an incomplete web page, and receive content means the web page was downloaded and the time that it was it downloaded onto the computing device 108 of the end user 102. These identified faults may apply to other services and applications, not limited to the users 102 accessing the web.

Shown in parallel with the processing already described, is another embodiment. In this embodiment, the method for detecting faults starts with monitoring packets in block 202, proceeding along the right side to block 212.

In block 212, tracking interactions with a state transition diagram is shown. The state diagram may be constructed for at least the service 104 or the application 106 to monitor the progress of a transaction. The monitored packets 124 indicate when transitions between the states should occur. Next, block 214 illustrates identifying a fault occurrence. By identifying whether a fault occurred, includes determining whether an abnormal condition occurred on the computing device 108 of the end user 102 based on monitoring of the packets 124.

Next the process continues to block 220 for detecting the fault based on monitoring of the packets and to block 230 to use an algorithm to detect the fault. The algorithms are discussed in more details in the next sections.

White Box Algorithm

Figure 3:
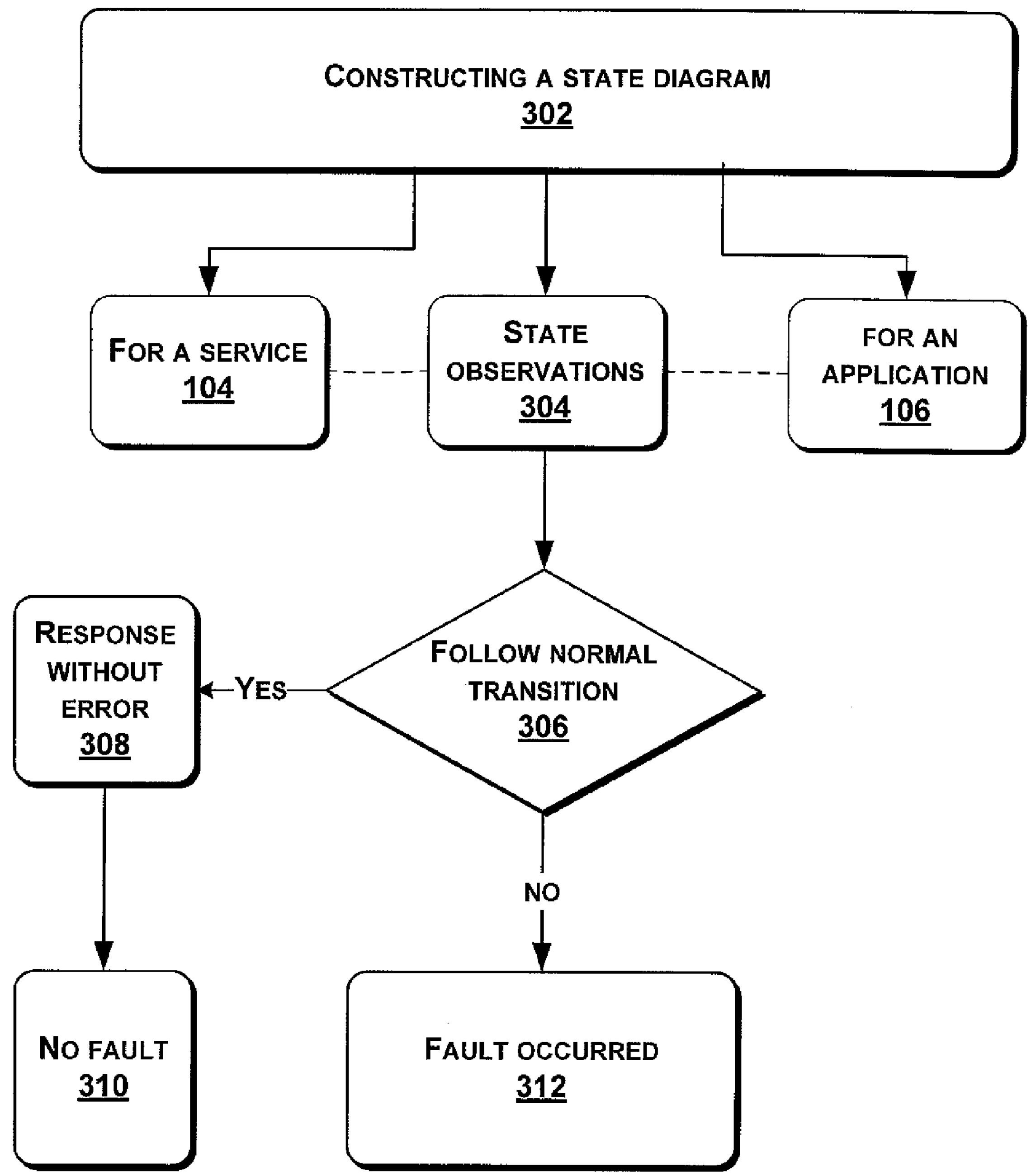
FIG. 3 is a flowchart of an exemplary white box algorithm for detecting the fault of FIG. 2.

FIG. 3 is a flowchart of an exemplary white box algorithm 300 for detecting the fault of FIG. 2. HTTP is one of the most common applications in enterprise networks. In this embodiment, a white-box approach, using HTTP header information to detect faults is illustrated.

Approaches using HTTP to detect errors have been tried. One approach is using the HTTP status codes to detect errors. Using HTTP status codes by itself is not very effective, as many normal HTTP activities may return 401 unauthorized codes due to authentication requirements. If the 401 unauthorized codes are followed by a success status code, the 401 unauthorized codes are just warnings, prompting the user to enter the right credential. Thus, the user may not be aware there are problems.

However, if the 401 unauthorized code is the only returned status code, then the user will get the unauthorized error. This simple inspection of HTTP status code is not sufficient to detect user perceived errors. In particular, errors such as operation timed-out or unable to connect to a server are not detected. Thus, more information is desired to accurately detect all types of faults.

In block 302, the white box algorithm includes constructing a state diagram for at least one of the service 104 or the application 106 in the enterprise network 122. The algorithm uses the state transition diagram to monitor the progress of a transaction.

Block 304 illustrates the state observations are collected, tracked, or identified for the state diagram. These state observations include monitored packets 124 to indicate when the transactions between the states should occur.

Block 306 represents evaluating whether the normal transition is followed. If the state observations follow the normal transition, then the process flow may take a YES branch to block 308 to indicate there was a response without error. In particular, the states are used to denote the progression of usage of the service 104 or the application 106 by the computing device 108 of the end user 102. Next, the process flow may then proceed to block 310 to indicate there was no fault with the service 104 or the application 106.

Returning to block 306, for the evaluation of whether the normal transition is followed is determined. If the state observations fail to follow the normal transition, the process flow may take a NO branch to block 312, fault occurrence. Thus, the fault occurrence 312 is indicative of the fault that occurred during use of the service 104 or the application 106 in the enterprise network 122 by the computing device 108 of the end user 102. It is noted that blocks 308 and 312 may be repeated at any suitable interval to monitor the continued state of the connection of the computing device 108 of the end user 102 while accessing the service 104 or the application 106 in the enterprise network 122.

Furthermore, the output of the fault localization algorithm is an observation indicating the probability that the service 104 or the application 106 is in a specific operational status. By detecting the fault, alerts may be sent to the appropriate entities. These entities may include, but is not limited to, IT administrators, an alert reporting system, a fault diagnosis, or a fault localization system.

The detection of faults may be used interactively or passively by the end user 102. For example, in a passive role of the end user 102, the fault detection may be implemented, diagnosed, or repaired by IT administrators in the enterprise network 122. In an interactive role, the end user 102 may view the fault detection and if minor, repair the fault. Thus, providing less downtime for the end user 102.

The white-box algorithm may parse into HTTP header information, such as a command (get, post), HTTP return code (200 OK, or 502 bad gateway). The white-box approach may report the failure that occurred on all the websites that the end user 102 is browsing, and the white-box scheme may be used as a validation tool for other HTTP detection schemes.

The white-box approach can detect failures with high accuracy, but requires knowledge about packet header information of the applications. Under certain circumstances, HTTP header information may not be obtainable, e.g. when packets are encrypted. Therefore, a black-box approach for HTTP fault detection may be generalized to different applications.

Exemplary Black Box Algorithm

Figure 4:
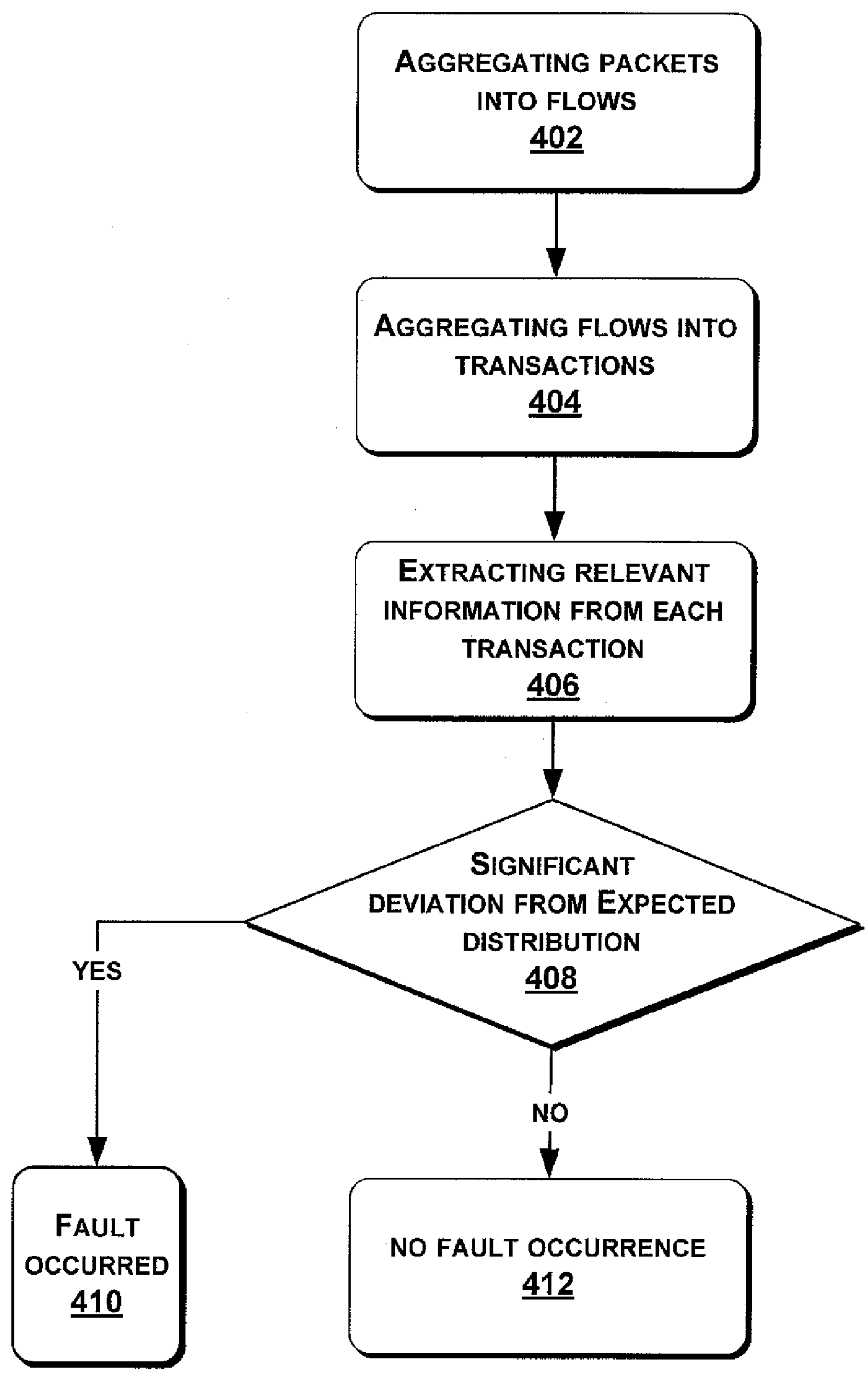
FIG. 4 is an overview flowchart of an exemplary black box algorithm for detecting the fault of FIG. 2.

FIG. 4 is an overview flowchart of an exemplary black box algorithm for detecting the fault 400 of FIG. 2. This approach may be used with TCP, IP, or UDP header information, applications with encrypted packets, non-HTTP applications, the Microsoft Exchange application, and the like. The IP header may include a source and a destination address while the TCP and UDP headers include a source and a destination port.

Block 402 illustrates aggregating the packets 124 into flows. Aggregating packets into flows includes matching on at least one of the packet properties. Aggregating packets into flows may be performed by using at least one of a 5-tuple (SrcLP, DstJP, SrePort, DstPort, or Proto). The flows that are related may be collected into transactions, where the related flows are identified comprising at least one of the 5-tuple (SrcIP, DstIP, SrcPoff, DstPort, or Proto) and the time interval between flows.

In another embodiment, aggregating packets into flows may be performed by aggregating packets into transactions, which includes matching on at least one of the packet properties. Collecting flows, related to transactions includes, wherein aggregating packets into flows comprises finding packet matching on at least one of 5-tupte selected from a group consisting of SrcIP, DstJIP, SrcPort, DatPort, and Proto.

When persistent HTTP connection is used, the boundaries of flows with the same 5-tuple may be used with a timeout period of 60 seconds or a GET<URL> command, where the URL is different from the previous GET<URL> command. The default timeout is 60 seconds to accommodate TCP retransmission timeouts. If non-persistent HTTP connection is used, each transaction may involve multiple flows.

Block 404 illustrates aggregating flows into transactions. The transactions correspond to fetching an Uniform Resource Locator (URL). Furthermore, the transactions may also correspond to an interaction with an Microsoft Exchange server.

Block 406 illustrates extracting relevant information from each transaction. The relevant information for each transaction includes a size of a transaction, an average packet size, a number of packets in each transaction, and an elapsed time of the transaction.

In block 408, there is a determination of whether there is a significant deviation of the relevant information from an expected distribution of the relevant information. If there is a significant deviation, then the process flow proceeds to a YES branch. The YES branch then proceeds to block 410 indicating a fault occurred.

Returning to block 408, if no significant deviation from the expected distribution of the relevant information occurred, then the process flow proceeds to a NO branch. The NO branch then proceeds to block 412, indicating no fault occurred.

It is noted that blocks 410 and 412 may be repeated at any suitable interval to monitor the continued state of the connection of the end user 102 while accessing the service 104 or the application 106 in the enterprise network 122. By detecting the fault, alerts may be sent to the appropriate entities. These entities may include, but is not limited to, IT administrators, an alert reporting system, a fault diagnosis, or a fault localization system.

White Box Algorithm with Bytes

Figure 5:
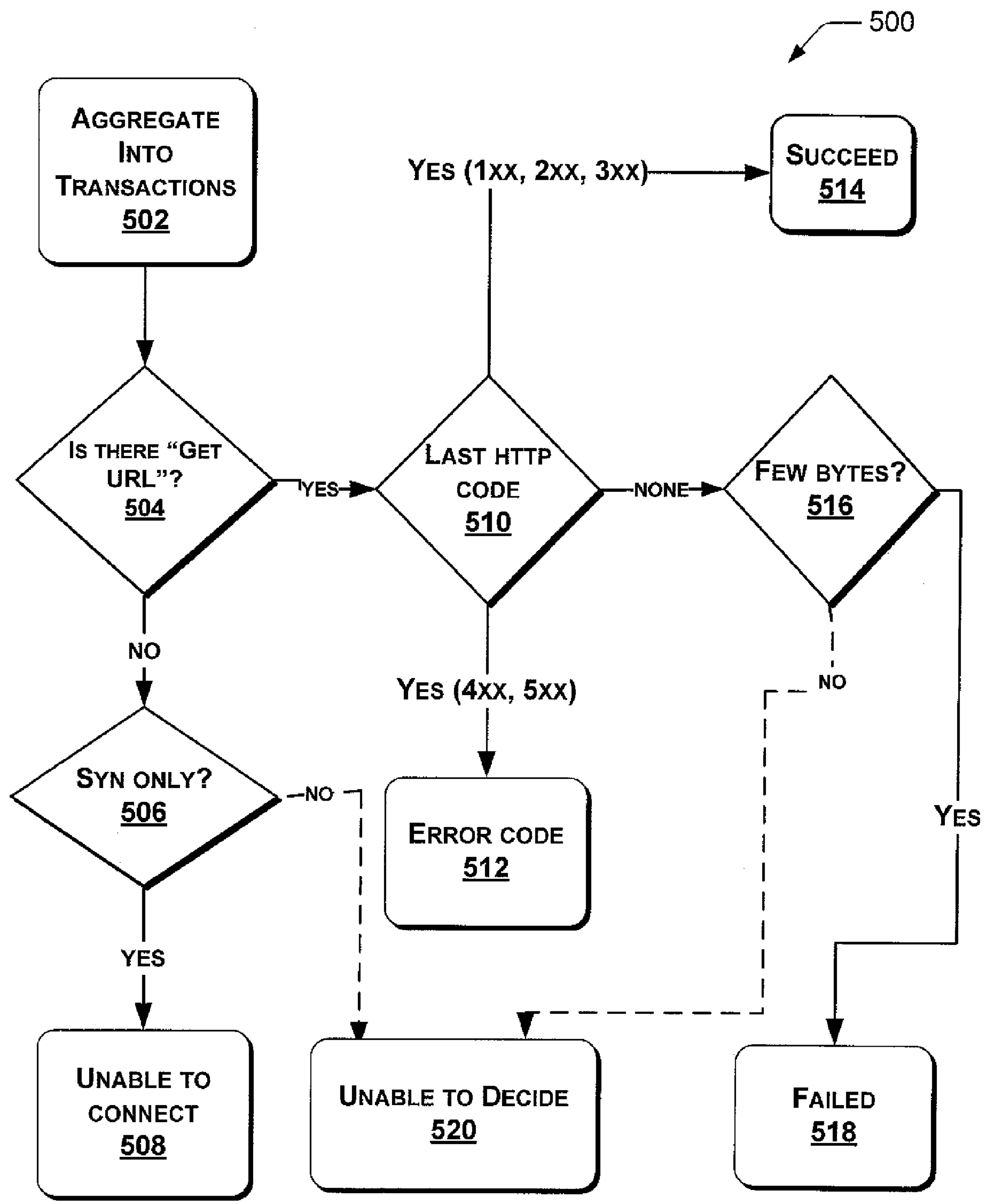
FIG. 5 is a flowchart of an exemplary black box algorithm for detecting the fault of FIG. 4 (shown in more details).

FIG. 5 is a flowchart of an exemplary white box algorithm for detecting the fault 500 of FIG. 4 (shown with more details). Typically, using HTTP status codes alone to detect errors is not very effective. Many normal HTTP activities may return 401 unauthorized codes due to authentication requirements. If the 401 is followed by a 2xx or 3xx (success) status code, the 401 is just a warning, which prompt the users to enter the right credential. Therefore, users will not perceive problems at all.

The claimed subject matter includes aggregating the packets, according to a user task and uses the number of packets, bytes and transaction time to detect failure. Starting on the left side of the flowchart, block 502 illustrates aggregating the packets 124 into transactions, where each transaction may correspond to fetching one URL. After aggregating the packets, the following information is extracted from each transaction: SYN, GET<URL>, HTTP return code, number of bytes from the web server, and transaction time.

Block 504 illustrates determining whether the transaction contains "Get URL?". When a non-persistent HTTP connection is used, each transaction may involve multiple flows. Each of these flows will correspond to the same GET<URL>. Therefore, it is possible to aggregate all the flows with the same GET<URL> into a transaction. Since multiple transactions may fetch the same URL, a timeout period of 100 ms or a 2xx/3xx status code to separate flows with the same GET<URL> into different transactions may be used. The 100 ms threshold is sufficiently large to cover the gap between most HTTP flows.

If the response is No to "Get URL?", block 504, the process proceeds to SYN only? in block 506. This block determines whether the transaction only contains SYN, such as a synchronize packet. If the transaction only contains SYN, the process flows to Yes to show that the computing device 108 of the computing device 108 of the end user 102 is unable to connect to the server, block 508. This error may be attributed to transport error, operation timed-out, and the like.

Returning to block 504, "GET URL", if the transaction contains a GET<URL>, the process flow takes the YES branch. The Yes branch proceeds to check the HTTP status code in the last packet of the transactions, block 510. The HTTP status code has three conditions. First, if the HTTP status code is 4xx, 5xx, this indicates a content error code, as shown in block 512. Content errors may include bad request, unauthorized access, internal server error, bad gateway, and the like. Second, if the HTTP status code is 1xx, 2xx, 3xx, this indicates the success of the transaction, block 514 Succeed. Third, if there is not a HTTP status code, shown as none, then the process flow proceeds to Few Bytes, block 516.

Turning to block 516, Few Bytes?, if there are a few bytes, the process flow proceeds the Yes, which shows the attempt Failed, block 518. A small number of bytes is an indication of content error of HTTP returns, such as 401 unauthorized, or 500 internal server error. If there are not a few bytes, the process flow takes a No branch to block 520, unable to decide. The number of packets and the transaction time will reflect the network performance degradation such as link congestion.

Returning to block 506, SYN only?, if the transaction does not only contain SYN, the process flows to No to show that the server is unable to decide 520 the next steps.

Cumulative Distribution of Total Bytes of a URL

Figure 6:
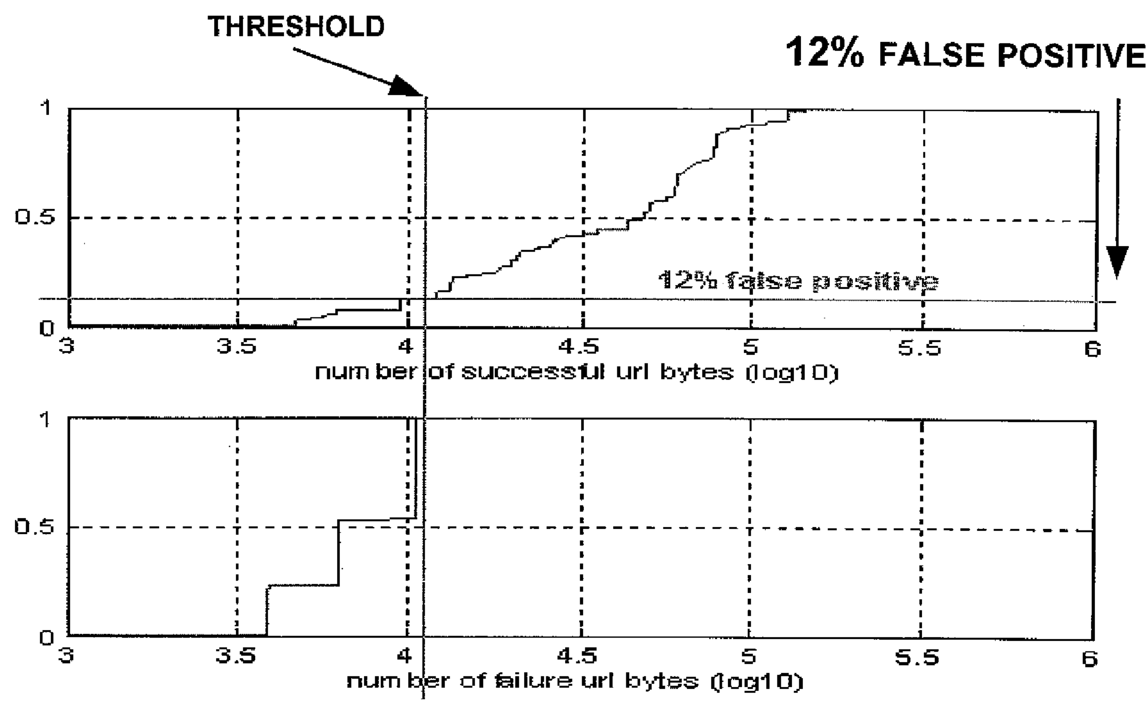
FIG. 6 is a schematic block diagram of exemplary cumulative distributions of total bytes of a URL.

FIG. 6 is a schematic block diagram of exemplary cumulative distributions of URL bytes 600. The black box approach aggregates packets into transactions to perform fault detection. For example, the transaction is on the user level, such as the user click. This level is a much more coarse-grain level than the previous URL level transaction discussed, since each user click may involve several different URLs, such as redirected URLs or the URLs of embedded pictures.

Without the HTTP header information, it is impossible to decouple these packets into URLs level transactions. The packets in these redirected or embedded URLs depend on the main page packets. Therefore, these packets are grouped together as the user-level transaction. As previously mentioned, the 5-tuple of (SrcIP, DstIP, SrcPort, DstPort, Proto) may be used to aggregate packets into flows. Without HTTP header information, a 60 seconds timeout is used to determine boundaries between flows of the same 5-tuple. However, the flows are aggregated into one transaction if the time gap between the flows is smaller than 100 ms.

After aggregation, the total number of bytes of a transaction to is used to detect the fault. A small number of bytes may be caused by content errors, time-out or being unable to connect to the server. However, small bytes may also be caused by fetching a webpage with little content. Failed transactions tend to have much smaller number of bytes than successful transactions. Typically, if the number of bytes is small, the transaction has timed-out, such as when there is no HTTP return code.

FIG. 6 illustrates two plots for a total number of bytes of both successful and failed transactions. The top chart shows a number of successful URL bytes while the bottom chart shows a number of failure URL bytes. The vertical line, with the arrow pointing to it, is chosen as the threshold.

When the user 102 accessed the service 104 or the application 106, the requests from the user 102 may be redirected to other file servers based on the location of the user 102, the requested files, the load on the file servers, and the like. The user 102 requests may be redirected to proxy servers. The plots show that if the indicated threshold on the number of bytes in a transaction retrieving a URL is used to determine whether a transaction involved a fault or not, there would be a 12% false positive rate, but no false negatives. However, the aggregation performed by the disclosure has reduced false positives and eliminated false negatives.

Aggregation Properties Between End User and Mail Server

Figure 7:
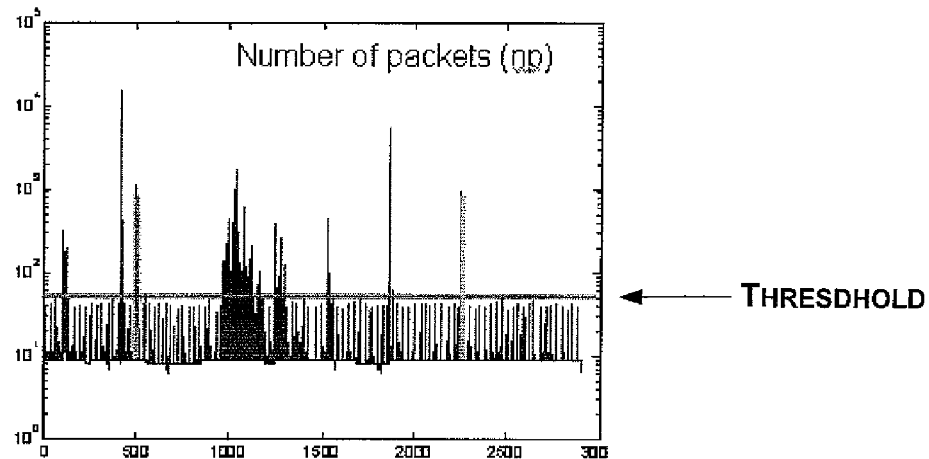
FIG. 7 is a schematic of block diagrams of exemplary aggregation properties between the end user and a mail server.
Figure 7:
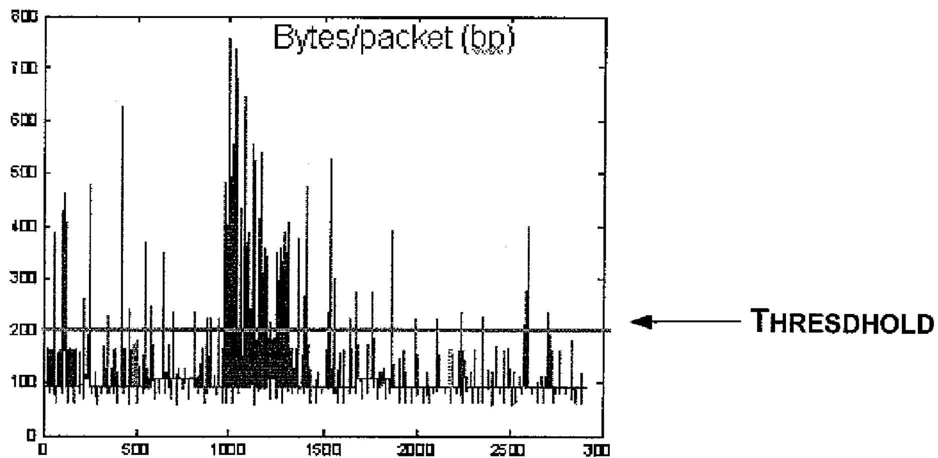
Figure 7:
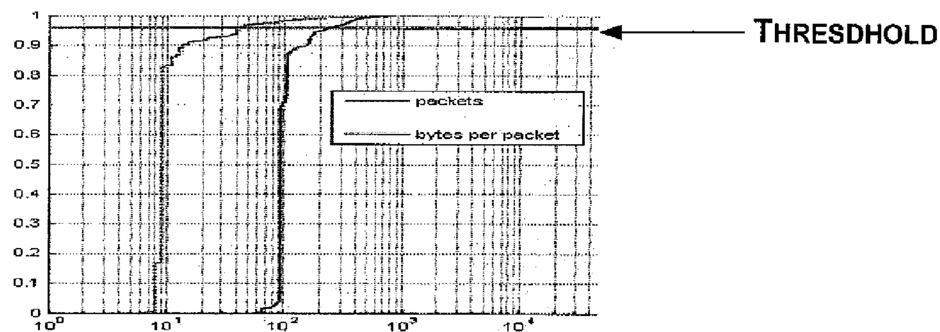

FIG. 7 is a schematic block diagram of exemplary aggregation properties between an end user 102 and a mail server 700. Microsoft Exchange is an example of a Mail Server. An Exchange transaction allows exchange of traffic between different internet service providers. The end user may send electronic emails to others not in the same network. The most common error of Exchange is the loss of connection between a server and the computing device 108 of the end user 102, due to a busy server or a broken link. When this occurs, the end user 102 will keep probing the server in order to re-establish the connection. As a result, there will be a large amount of small probe packets between the end user 102 and the server. However, when the end user 102 sends an email, there will also be many packets, but the packet size tends to be larger.

From the above observations, faults are detected in Exchange by examining the number of packets and the number of bytes per packets. If the number of packets exceeds some threshold, an event is suggested, e.g. an error or sending/receiving an email, has happened. At the same time, if the number of bytes per packets is below some threshold, some problem has occurred is suggested.

FIG. 7 illustrates how this scheme works by running a two-day packet trace collected from the computing device 108 of the end user 102. The number of packets and the number of bytes per packet in one-minute interval are computed between the end user 102 and the server. Shown in graph 702 is the number of packets versus time. In graph 704, the number of bytes per packet versus time is illustrated.

In graph 706, shown is a cumulative distribution of number of packets and bytes per packet. The thresholds covered 95% percent of the samples. Shown are the two intervals where the number of packets is above one threshold and the number of bytes per packet is below the other threshold. The first interval happened exactly during the time that the end user 102 experienced disconnection from the server.

Based on FIG. 7, the fault is detected when transactions exchange fewer bytes of data than a threshold. Furthermore, the fault is detected when the number of packets in a transaction is above a threshold and the average number of bytes per packet is below a threshold.

Exemplary Computing Environment

Figure 8:
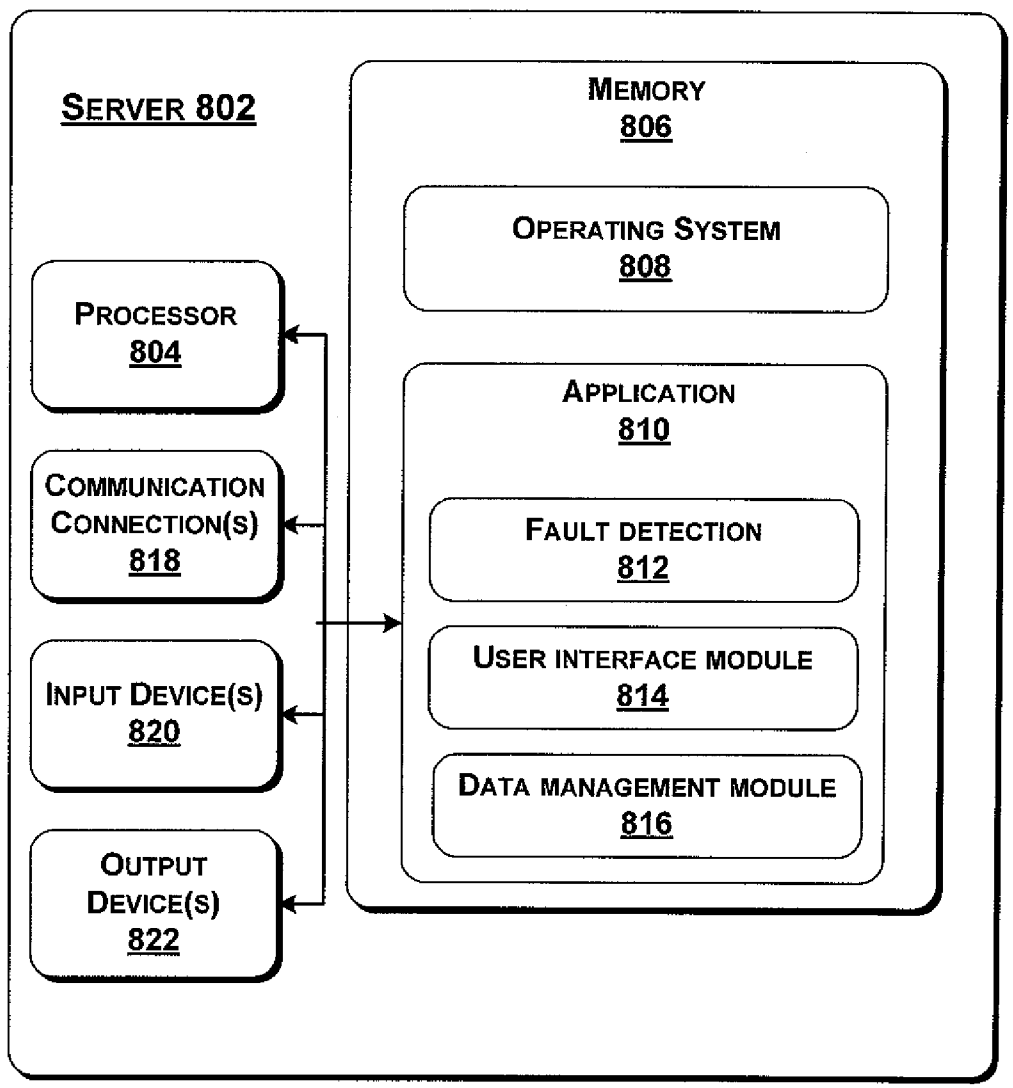
FIG. 8 is a schematic block diagram of an exemplary general operating environment to detect the fault of FIG. 2.

FIG. 8 is a schematic block diagram of an exemplary general operating environment 800 to detect the fault of FIG. 2. The environment may be configured as any suitable server 802 capable of implementing the fault detection. In one exemplary configuration, the server 802 comprises at least one processor 804 and memory 806. Depending on the configuration and type of computing device, memory 806 may be volatile (such as RAM) and/or non-volatile (such as ROM, flash memory, etc.).

Memory 806 can store programs executed on the processor 804 and data generated during their execution. It may store any number of programs, data objects, other data structures, including an operating system, one or more application programs, other program modules, and program data.

Memory 806 may include an operating system 808, one or more application programs 810 for implementing the fault detection 812, as well as various other data, programs, media, and the like. In one implementation, the memory 806 includes the fault detection 812, including a user interface module 814, and a data management module 816.

The user interface module 814 presents the user with a graphical user interface for services 104 or the applications 106, including an interface prompting the user to respond to error messages. The data management module 816 manages storage of information, such as stored database, errors, packet collections, and the like, and may communicate with one or more local and/or remote data bases such as a stored historical trend database.

Memory 806 can also include various computer-readable storage media. It will be understood that volatile memory may include media such as random access memory (RAM), non volatile memory may include read only memory (ROM) and flash portion. The computing environment 800 may also include other removable/non-removable, volatile/non-volatile computer storage media such as a hard disk drive for reading from and writing to a non-removable, non-volatile magnetic media, a magnetic disk drive for reading from and writing to a removable, non-volatile magnetic disk (e.g., a "floppy disk"), and an optical disk drive for reading from and/or writing to a removable, non-volatile optical disk such as a CD-ROM, DVD-ROM, or other optical media. The disk drives and their associated computer-readable media can provide non-volatile storage of computer readable instructions, data structures, program modules, and other data for the server 802.

The server 802 may also contain communications connection(s) 818 that allow the server 802 to communicate with the stored database, the user 104, and/or other devices on a network. Communications connection(s) 818 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The server 802 may also include but is not limited, to input device(s) 820, such as a keyboard, a mouse, a stylus-based device. The server 802 may include output devices 822, such as a display screen, speakers, printer, and the like. All these devices are well know in the art and need not be discussed at length here.

The subject matter described above can be implemented in hardware, or software, or in both hardware and software. Although the subject matter has been described in language specific to structural features and/or methodological acts, it is to be understood that the subject matter defined in the appended claims is not necessarily limited to the specific features or acts described above. Rather, the specific features and acts are disclosed as exemplary forms of implementing the claimed subject matter. For example, the methodological acts need not be performed in the order or combinations described herein, and may be performed in any combination of one or more acts.

The invention claimed is:

1. A method for detecting a fault by analysis of a packet trace, implemented at least in part by a computing device, the method comprising:

monitoring at least one packet transmitted to or received from, a computing device of an end user, and one or more computing devices implementing at least one of a service or an application on an enterprise network;

identifying whether an abnormal condition occurred on the computing device of the end user based on monitoring at least one packet transmitted to or received from, the computing device of the end user; and detecting a fault by using an algorithm that comprises monitoring at least one packet transmitted or received from, the computing device of the end user;

wherein the fault indicates a desired course of action did not occur while the computing device of the end user uses at least one of the service or the application in the enterprise network, wherein an output of the algorithm comprises a probability associated with an operational status of at least one of the service or the application.

2. The method of claim 1, wherein the one or more computing devices implementing at least one of the service or the application comprises a remote computing device.

3. The method of claim 1, wherein the algorithm comprises constructing a state diagram for at least one of the service or the application; and wherein failures of messages to follow a normal transition in the state diagram, indicates that a fault occurred during a usage of the service or the application.

4. The method of claim 1, wherein the algorithm comprises aggregating packets into transactions and extracting relevant information from each transaction wherein a significant deviation of the relevant information from an expected distribution of the relevant information indicates a fault occurred on the computing device of the end user.

5. The method of claim 4, wherein the transactions correspond to fetching an Uniform Resource Locator (URL).

6. The method of claim 5, wherein the transactions correspond to an interaction with an Exchange server.

7. The method of claim 6, wherein collecting packets into transactions comprises:

aggregating packets into flows comprises matching on at least one of the packet properties, selected from a group consisting of SrcIP, DstIP, SrcPort, DstPort, and Proto; and collecting flows, related to a transaction, wherein identification of the related flows occurs by matching on comprising at least one of the flow properties selected from a group consisting of SrcIP, DstIP, SrcPort, DstPort, and Proto; or forming transactions by splitting a single flow into multiple transactions.

8. The method of claim 4, wherein the relevant information comprises a size of a transaction, an average packet size, a number of packets in each transaction, and an elapsed time of the transaction.

9. The method of claim 8, wherein a fault detection occurs if a transaction exchanges fewer bytes of data than a byte threshold.

10. The method of claim 8, wherein a fault detection occurs if a number of packets in a transaction exceeds a packet number threshold and an average number of bytes per packet is below a bytes per packet threshold.

11. One or more computer-readable storage media comprising computer-executable instructions that, when executed, perform the method as recited in claim 1.

12. A computer-readable storage media comprising computer-readable instructions executed on a computing device, the computer-readable instructions comprising instructions for:

accessing at least one of a service or an application in an enterprise network;

monitoring at least one packet transmitted to or received from a computing device of an end user, with one or more computing devices implementing at least one of the service or the application in the enterprise network;

detecting a fault occurrence on the computing device of the end user based on monitoring at least one packet transmitted to or received from the computing device of the end user, wherein the detecting uses an algorithm to detect the fault; and wherein the fault indicates that a desired course of action did not occur while accessing at least one of the service or the application in the enterprise network, wherein the algorithm comprises aggregating packets into transactions; and extracting relevant information from each transaction, wherein the relevant information comprises a size of a transaction, an average packet size, a number of packets in each transaction, and an elapsed time of the transaction;

wherein a significant deviation of the relevant information from an expected distribution of the relevant information indicates a fault occurred on the computing device of the end user.

13. The computer-readable storage media of claim 12, wherein the algorithm comprises constructing a state diagram for a state diagram for at least one of the service or the application.

14. The computer-readable storage media of claim 12, further comprising at least one of a 5-tuple (SrcIP, DstIP, SrcPort, DstPort, or Proto) to aggregate the packets into flows.

15. The computer-readable storage media of claim 12, wherein a fault detection occurs if a transaction exchanges fewer bytes of data than a byte threshold.

16. The computer-readable storage media of claim 12, wherein a fault detection occurs if a number of packets in a transaction exceeds a packet number threshold and an average number of bytes per packet is below a bytes per packet threshold.

17. A system for fault detection using a packet trace approach, the system comprising:

a processor;

a memory coupled to the processor for detecting a fault;

wherein the processor is configured for:

examining at least one packet transmitted to or received from, an computing device of the end user, between one or more computing devices implementing at least one of a service or an application in an enterprise network;

detecting a fault occurrence on the computing device of the end user based on examining at least one packet transmitted to or received from, the computing device of the end user;

using an algorithm to detect the fault; and displaying an output of the algorithm wherein the output comprises an observation indicating the probability that the service or application is in a specific operational state; and wherein the fault indicates that a desired course of action did not occur while accessing at least one of the service or the application.

18. The system of claim 17, wherein the algorithm comprises aggregating packets into transactions, wherein aggregating packets into flows comprises finding packet that match on at least one of 5-tuple selected from a group consisting of SrcIP, DstIP, SrcPort, DstPort, and Proto;

collecting flows that are related into a transactions, wherein the flows that are related are identified comprising at least one of 5-tuple selected from the group consisting of SrcIP, DstIP, SrcPort, DstPort, and Proto, and the time interval between flows; and extracting relevant information from each transaction, wherein the relevant information comprises a size of a transaction, an average packet size, a number of packets in each transaction, and an elapsed time of the transaction;

wherein a significant deviation of the relevant information from an expected distribution of the relevant information indicates a fault occurred on the computing device of the end user;

wherein a fault is detected when the number of packets in a transaction is above a threshold and the average number of bytes per packet is below the threshold.

* * * * *